UNITED STATES PATENT OFFICE.

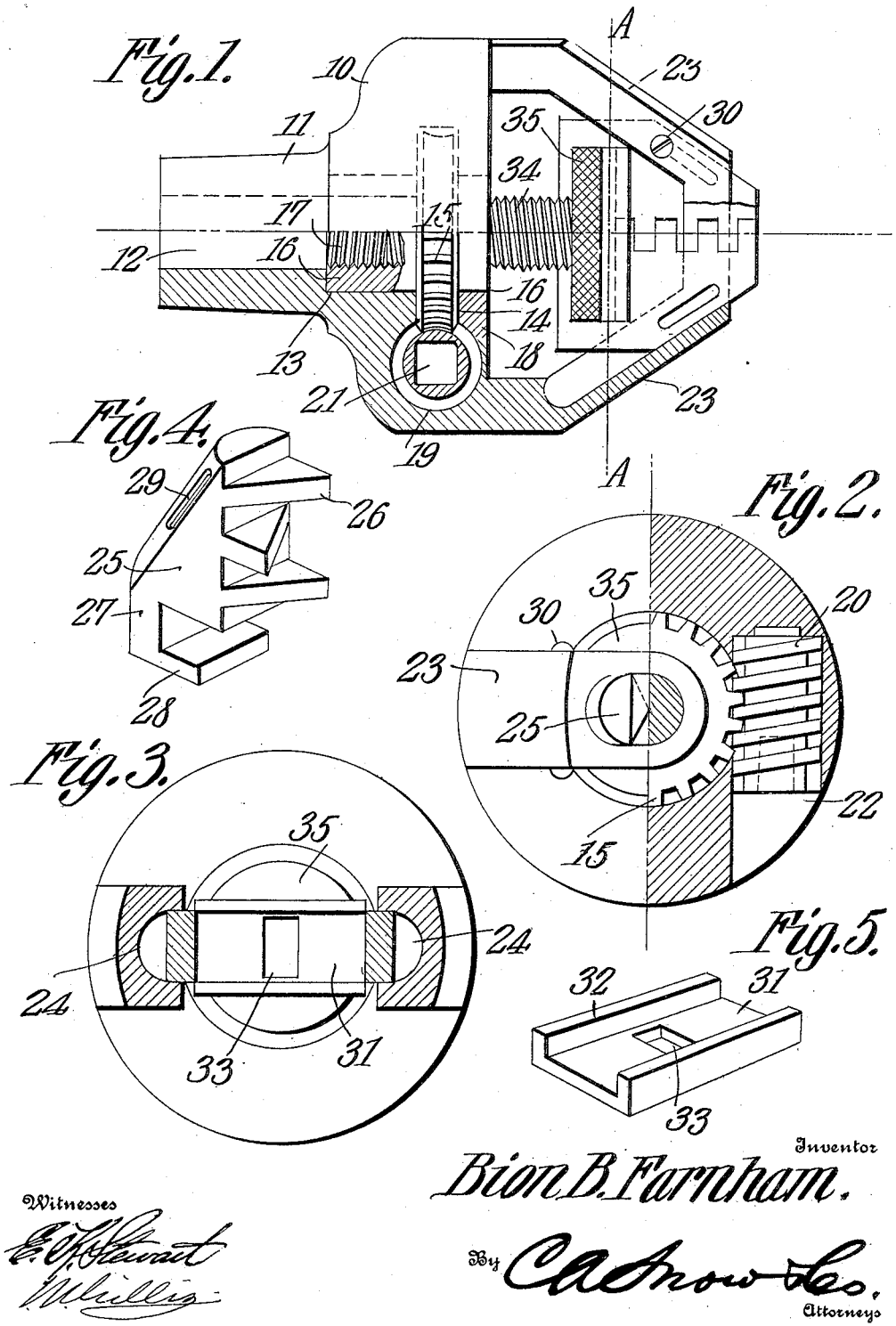

BION B. FARNHAM, OF TONAWANDA, NEW YORK.

DRILL-CHUCK.

No. 914,255.  Specification of Letters Patent.  Patented March 2, 1909.

Application filed June 9, 1908. Serial No. 437,587.

*To all whom it may concern:*

Be it known that I, BION B. FARNHAM, a citizen of the United States, residing at Tonawanda, in the county of Erie and State of New York, have invented a new and useful Drill-Chuck, of which the following is a specification.

This invention relates to drill chucks and more especially to that type of drill chuck in which the jaws are brought together by being forced outward along a pair of converging guides.

One object of the invention is to provide an improved chuck in which the parts may be quickly adjusted to approximately the desired position, and then adjusted by a slow motion to firmly clamp the shank of a drill between the jaws.

Another object of the invention is to provide a quick adjustment that may be operated without the need of a tool of any sort.

A still further object of the invention is to provide an improved form of converging guides and jaws.

The invention consists in general of a chuck body on which is mounted a pair of jaws moving in converging guides, a rapid adjustment for said jaws, and a slow and powerful adjustment therefor.

With the above and other objects in view, the invention consists further in certain novel details of arrangement and combinations of parts hereinafter fully described, illustrated in the accompanying drawings, and specifically set forth in the claims.

In the accompanying drawings, like characters of reference indicate like parts in the several views, and Figure 1 is a side elevation partly in section of a drill chuck constructed in accordance with this invention. Fig. 2 is a front elevation partly in section of the same. Fig. 3 is a sectional view on the line A—A of Fig. 1. Fig. 4 is a detail perspective view of one of the jaws. Fig. 5 is a similar view of the jaw plate.

The numeral 10 indicates the body of the device which is provided with a tapered shank 11, the taper being of the usual form. This tapered shank is hollow as indicated at 12 and at the outer end of this hollow portion there is formed a recess 13 provided with an extended annular portion 14. The outer part of the extended annular portion of the recess is threaded as shown in Fig. 1. Lying within the recess 13 and the annular portion 14, is a worm wheel 15 provided with hub ends 16 and further having a screw threaded opening 17 therethrough. A threaded collar nut 18 is held in the threaded portion of the annular extension of the recess 13 and serves to keep the worm wheel in position within this recess. A recess 19 is preferably formed with its axis at right angles to the axis of the truck, and a worm 20 is held in this recess in mesh with the worm wheel 15. This worm is provided at one end with a recess 21 for a key wrench, so that the worm may be revolved thereby and thus revolve the worm wheel. The worm is held in position within the recess by means of a pin or stud 22 extending across the recess and out of alinement with the recess 21 of the worm. Converging guide arms 23 are provided on the body portion and each of said arms is formed with a semi-cylindrical guide as indicated at 24. Slidably mounted within the guide arms 23 are jaws 25 provided with teeth 26 arranged to engage the shank of a drill. The portion of these jaws in contact with the semi-cylindrical guide 24, is also semi-cylindrical in form. By means of this peculiar shape all side lash is avoided and when the drill is held in the chuck a straight and true hole will be drilled, and the drill prevented from chattering. The back end of each of the jaws is provided with a rearwardly extending portion 27 having an inwardly bent end 28.

In order to hold the jaws within the guides and cause them to closely engage the guides when moving rearwardly, there is provided in each of the jaws a pair of recesses extending longitudinally of the semi-cylindrical portion as indicated at 29. Each of the guide arms 23 is provided with a screw 30 on each side thereof arranged to enter the recess 29 of the jaws 25. By this means the jaws are held in the guides and when retracted are forced apart.

In order to provide a centrally disposed means to receive the tang of the drill shank as well as to prevent the jaws getting out of alinement there is provided a channel plate 31 having side ribs 32 and a centrally disposed rectangular opening 33 arranged to receive the tang of a drill shank. This plate 31 is of such width between the ribs as to enable the same to embrace the sides of the jaws 25 and the plate is held between the portion 28 of the jaw and the body thereof.

In order to provide for a quick adjustment of the jaws on the drill shank a thumb screw 34 is held in the threaded portion 17 of the worm wheel, and is provided with a preferably milled head 35. This head may, however, be finished in any other manner suitable for operation by the thumb and fingers of the user's hand.

The distance between the portion 28 of the jaw and the body thereof is substantially equal to the thickness of the milled head 35 added to the thickness of the channel plate 31. The parts are further so arranged that when assembled the milled head 35 will lie between the channel plate 31 and the portion 28 of the jaw 25.

In the operation of the device, when it is desired to retract the jaws for the insertion of a drill shank therebetween, it is simply necessary to rotate the milled head 35 (in the present instance to the right), and this will draw the jaws rearwardly and cause the same to open. The drill shank is then inserted and the milled head turned in the opposite direction until pressure is brought to bear against the drill shank. When as much pressure as can conveniently be obtained with the thumb and fingers of the user's hand, has been brought to bear in this manner, a key wrench is inserted in the opening 21 of the worm, and the worm rotated therewith. The friction between the milled head 35 and the channel plate 31 will prevent the screw 34 from turning and the same will be forced out and clamp the jaws firmly and securely against the shank of the drill. It is to be noted that in inserting the shank the tang should be pushed into the opening 33 of the channel plate.

There has thus been provided a simple and efficient device, of the character described, and for the purpose specified.

It is obvious that minor changes may be made in the form and proportions of the device without departing from the material principles thereof. It is not therefore desired to confine the invention to the exact form herein shown and described, but it is wished to include all such as properly come within the scope of the invention.

Having thus described the invention, what is claimed, is:—

1. In a drill chuck, a body having converging jaw guides, jaws mounted for sliding movement in the guides, each of the said jaws being provided with a recess, an adjusting screw carried by the body and having a head seated in the recess of the jaws, and a channel plate disposed against the head and receiving between its flanges portions of the jaws.

2. In a chuck, a body, guides thereon, jaws mounted to slide in said guides, a worm wheel provided with a threaded opening therethrough held to revolve in said body, a worm held in said body in mesh with said worm wheel and provided with an end adapted to receive a wrench, a screw held in the threaded opening of the worm wheel, and a milled head on said screw engaging said jaws.

3. In a drill chuck, a body, jaws mounted in the body, a rotatable sleeve in the body, said sleeve being formed with a worm section, a worm journaled in the body, and an adjusting screw engaged between the jaws and threaded into the sleeve.

In testimony that I claim the foregoing as my own, I have hereto affixed my signature in the presence of two witnesses.

BION B. FARNHAM.

Witnesses:
JAMES P. LINDSAY,
DUNCAN SINCLAIR.